United States Patent
Reed et al.

(10) Patent No.: US 7,655,214 B2
(45) Date of Patent: Feb. 2, 2010

(54) PHASE FORMATION OF OXYGEN REDUCED VALVE METAL OXIDES AND GRANULATION METHODS

(75) Inventors: David M. Reed, Douglassville, PA (US); Sridhar Venigalla, Macungie, PA (US); Jeffrey A. Kerchner, Fleetwood, PA (US)

(73) Assignee: Cabot Corporation, Boston, MA (US)

( * ) Notice: Subject to any disclaimer, the term of this patent is extended or adjusted under 35 U.S.C. 154(b) by 648 days.

(21) Appl. No.: 10/786,621

(22) Filed: Feb. 25, 2004

(65) Prior Publication Data

US 2005/0008564 A1 Jan. 13, 2005

Related U.S. Application Data

(60) Provisional application No. 60/450,536, filed on Feb. 26, 2003.

(51) Int. Cl.
- C01G 33/00 (2006.01)
- C22C 29/12 (2006.01)
- H01G 9/042 (2006.01)
- C01B 13/14 (2006.01)

(52) U.S. Cl. .............. 423/594.17; 423/62; 423/592.1; 75/232; 75/255; 419/10; 419/19; 361/528; 428/472

(58) Field of Classification Search .............. 423/592.1, 423/594.17, 62; 75/255, 232; 419/19, 10; 361/528; 428/472
See application file for complete search history.

(56) References Cited

U.S. PATENT DOCUMENTS

| | | | |
|---|---|---|---|
| 1,415,516 A | 5/1922 | Bridge | |
| 1,906,184 A | 4/1933 | Bohn | |
| 2,183,517 A | 12/1939 | Leemans et al. | 75/135 |
| 2,242,759 A | 5/1941 | Schlecht et al. | 75/84 |
| 2,443,524 A | 6/1948 | Kroll et al. | 423/62 |
| 2,621,137 A | 12/1952 | Miller | 148/13.1 |
| 2,700,606 A | 1/1955 | Wilhelm et al. | 75/84 |
| 2,761,776 A | 9/1956 | Bichowsky | 75/5 |
| 2,861,882 A | 11/1958 | Bichowsky | 75/84 |
| 2,937,939 A | 5/1960 | Wilhelm et al. | 75/84 |
| 2,992,095 A | 7/1961 | Li | 75/27 |
| 3,421,195 A | 1/1969 | Berryhill | 29/25.42 |
| 3,647,420 A | 3/1972 | Restelli | 75/84 |
| 3,665,260 A | 5/1972 | Kirkpatrick et al. | 361/529 |

(Continued)

FOREIGN PATENT DOCUMENTS

AU 104631 8/1937

(Continued)

OTHER PUBLICATIONS

Abstract Document No. 129:284714, 1998, no month.

(Continued)

*Primary Examiner*—Ngoc-Yen M. Nguyen
*Assistant Examiner*—Diana J Liao

(57) ABSTRACT

Valve metal suboxides having a primary suboxide phase and optionally a secondary suboxide phase, a valve metal phase, and/or at least one tertiary suboxide phase can be present in varying amounts. Also disclosed is anodes and capacitors containing the valve metal suboxides of the present invention. Also, a method to prepare a valve metal suboxide is further described which includes granulating one or more of the starting materials individually or together and/or granulating the final product.

19 Claims, 2 Drawing Sheets

U.S. PATENT DOCUMENTS

| | | | |
|---|---|---|---|
| 3,849,124 A | 11/1974 | Villani | 420/422 |
| 3,926,832 A | 12/1975 | Barosi | 252/181.6 |
| 3,962,715 A | 6/1976 | Raccah et al. | 357/2 |
| 4,032,328 A | 6/1977 | Hurd | 75/84.1 |
| 4,059,442 A | 11/1977 | Bernard | 75/208 R |
| 4,118,727 A | 10/1978 | Laplante | 357/10 |
| 4,126,493 A | 11/1978 | Wurm | 148/20 |
| 4,186,423 A | 1/1980 | Yoshida et al. | 361/525 |
| 4,201,798 A | 5/1980 | Lindmayer | 427/74 |
| 4,406,699 A | 9/1983 | Beck et al. | 75/233 |
| 4,428,856 A | 1/1984 | Boyarina et al. | 252/181.1 |
| 4,483,819 A | 11/1984 | Albrecht et al. | 419/2 |
| 4,722,756 A | 2/1988 | Hard | 148/126.1 |
| 4,748,737 A | 6/1988 | Charles et al. | 29/599 |
| 4,805,074 A | 2/1989 | Harakawa et al. | 361/525 |
| 4,923,531 A | 5/1990 | Fisher | 148/126.1 |
| 4,960,471 A | 10/1990 | Fife | 148/20.3 |
| 4,964,906 A | 10/1990 | Fife | 75/369 |
| 5,011,742 A | 4/1991 | Fife et al. | 428/558 |
| 5,013,357 A | 5/1991 | Worcester et al. | 75/622 |
| 5,022,935 A | 6/1991 | Fisher | 148/126.1 |
| 5,171,379 A | 12/1992 | Kumar et al. | 148/422 |
| 5,211,741 A | 5/1993 | Fife | 75/255 |
| 5,245,514 A | 9/1993 | Fife et al. | 361/529 |
| 5,369,547 A | 11/1994 | Evans | 361/516 |
| 5,412,533 A | 5/1995 | Murayama et al. | 361/528 |
| 5,448,447 A | 9/1995 | Chang | 361/529 |
| 5,470,525 A | 11/1995 | Tripp et al. | 419/36 |
| 5,733,489 A * | 3/1998 | Hill | 264/125 |
| 5,825,611 A | 10/1998 | Pozdeev | 361/524 |
| 5,993,513 A | 11/1999 | Fife | 75/743 |
| 6,007,597 A | 12/1999 | Puopolo et al. | 75/10.14 |
| 6,051,044 A | 4/2000 | Fife | 75/229 |
| 6,051,326 A | 4/2000 | Fife | 428/610 |
| 6,136,062 A | 10/2000 | Loffelholz et al. | 75/369 |
| 6,165,623 A | 12/2000 | Fife et al. | 428/472 |
| 6,312,642 B1 | 11/2001 | Fife | 419/30 |
| 6,322,912 B1 | 11/2001 | Fife | 428/702 |
| 6,373,685 B1 | 4/2002 | Kimmel et al. | 361/508 |
| 6,391,275 B1 | 5/2002 | Fife | 423/592 |
| 6,416,730 B1 | 7/2002 | Fife | 423/592 |
| 6,462,934 B2 | 10/2002 | Kimmel et al. | 361/508 |
| 6,527,937 B2 | 3/2003 | Fife | 205/209 |
| 6,576,038 B1 | 6/2003 | Rao | 75/255 |
| 6,576,099 B2 | 6/2003 | Kimmel et al. | 204/291 |
| 6,592,740 B2 | 7/2003 | Fife | 205/149 |
| 6,639,787 B2 | 10/2003 | Kimmel et al. | 361/508 |
| 6,759,026 B2 | 7/2004 | Kimmel et al. | 423/592.1 |
| 2001/0036056 A1 | 11/2001 | Kimmel et al. | 361/508 |
| 2002/0028175 A1 | 3/2002 | Fife | 423/592 |
| 2002/0114722 A1 | 8/2002 | Kimmel et al. | 419/45 |
| 2002/0135973 A1 | 9/2002 | Kimmel et al. | 361/509 |
| 2003/0104923 A1 | 6/2003 | Omori et al. | 501/134 |
| 2003/0117766 A1 | 6/2003 | Naito et al. | 361/525 |
| 2003/0147203 A1 | 8/2003 | Naito et al. | 361/524 |
| 2003/0170169 A1 | 9/2003 | Omori et al. | 423/592.1 |
| 2003/0205106 A1 | 11/2003 | Omori et al. | 75/245 |
| 2003/0230167 A1 | 12/2003 | Loeffelholz et al. | 75/255 |

FOREIGN PATENT DOCUMENTS

| | | |
|---|---|---|
| EP | 0 634 762 A1 | 9/1991 |
| EP | 0 634 761 A1 | 1/1995 |
| GB | 485318 | 5/1938 |
| GB | 489742 | 8/1938 |
| GB | 835316 | 5/1960 |
| GB | 1123015 | 8/1968 |
| GB | 198 312 80 | 1/2000 |
| WO | WO 98/19811 | 5/1998 |
| WO | WO 00/15555 | 3/2000 |
| WO | WO 00/15556 * | 3/2000 |
| WO | WO 01/35428 A1 | 5/2001 |
| WO | WO 01/71738 A2 | 9/2001 |
| WO | WO 01/99130 A1 | 12/2001 |
| WO | WO 02/068333 A2 | 9/2002 |
| WO | WO 02/090024 A1 | 11/2002 |

OTHER PUBLICATIONS

Abstract Document No. 129:130191, 1998, no month.
Abstract Document No. 128:288971, 1998, no month.
Abstract Document No. 85:170443, 1976, no month.
Abstract Document No. 83:140466, 1975, no month.
Abstract Document No. 104:229152, 1986, no month.
Abstract Document No. 104:198128, 1986, no month.
Abstract Document No. 108:122980, 1988, no month.
Abstract Document No. 106:42412, 1987, no month.
Abstract Document No. 110:224093, 1989, no month.
Abstract Document No. 109:103212, 1988, no month.
Abstract Document No. 116:199338, 1992, no month.
Abstract Document No. 113:10823, 1990, no month.
Abstract Document No. 120:179957, 1994, no month.
Abstract Document No. 119:84165, 1993, no month.
Abstract Document No. 118:86049, 1993, no month.
Mellor "Inorganic and Theoretical Chemistry" vol. IX, pp. 856-857, no date.
Pages 59, 65, and 66 of Encyclopedia of Chemical Technology, vol. 17, $4^{th}$ Edition, no date.
Young article, pp. 4 and 5 of Chapter 2, no date, no citation.
Vest et al., "Electrical Conductivity in Ceramics and Glass" Department of the Air Force, Aerospace Research Laboratories Wright-Patterson Air Force Base, Ohio. pp. 375-384. (1974).
Feschotte, et al., "Niobium Physico-Chemical Properties Of TTS Compounds and Alloys" Atomic Energy Review, Special Issue No. 2. International Atomic Energy Agency—Vienna (1968). pp. 57-59.
Kuz' micheva, et al., "Superconductivity in lathanide-strontium-niobium-oxide systems" Sh. Neorg. Khim. 38(1), 162-6. (1993) (with English translation).
Acrivos, et al., "Dynamic phenomena in superconducting oxides measured by ESR" Phys. Rev. B: Condens. Matter, 50(18), pp. 12710-12723. (1994).
Acrivos, et al., "Dynamics of flux motion . . . " Physica C (Amsterdam) 234-40(Pt. 5), pp. 3159-3160. (1994).
Georg Bauer, "The Oxides of Niobium," Zeitschrift fuer anorganische und allgemeine Chemie, vol. 248, Sep. 12, 1941, No. 1, pp. 1-31. (With Full English Translation).
J. W. Mellor, A Comprehensive Treatise on Inorganic and Theoretical Chemistry, Sep. 1947, vol. IX, p. 856.
"Niobium and Oxygen" Gmelins Handbook of Inorganic Chemistry, Verlag Chemi, 1970, pp. 14-44 (with English Translation).
Tagusagawa et al., "Niobium Compounds for Capacitor Application," TIC Meeting in Lisbon, pp. 1-11, (2003).
"Niobium Material Overview," http://www.espi-metals.com, pp. 223-228.
Hiraoka, et al., "Electrochemical Measurement of the Standard Free Energies of Formation of Niobium Oxides," Research Article, Department of Metallurgy and Materials Science, University of Tokyo, pp. 102-106, (1970).
Hiraoka et al., "Electrochemical Measurement of the Standard Free Energies of Formation of Niobium Oxides," Transactions ISIJ, vol. 11, pp. 102-106 (1971).
Baba et al., "Preparation and Chlorination of NbO2, NbO and NbC," Journal Mining and Mettalurgical Institute of Japan, vol. 82, No. 942, pp. 855-860 (1966).
Steeb, et al., "Niob und Sauerstoff," Gmelin, Niob, Part B1, vol. 49, pp. 26-33 (1970) w/ partial English trans.
Mudrolyubov, "Production of tantalum capacitors in the C.I.S," Philadelphia meeting of the TIC, pp. 3-4 (1991).
Andersson, "Die Bedeutung des Tantals in der Kondensatorindustrie," Erzmetall, vol. 48, No. 6/7, pp. 430-434 (1995).
Brauer et al., "Die Nitride des Niobs," Z. anorg. Allg. Chemie, vol. 270, pp. 160-178 (1952) w/ partial Engl. Trans.

Brauer, "Nitrides, Carbonitrides and Oxynitrides of Niobium," Journal of the less-Common Metals, vol. 2, pp. 131-137, (1960).

Schonberg, "Some Features of the Nb-N and Nb-N-O Systems," ACTA Chem. Scand., vol. 8, pp. 208-212 (1954).

Gannon et al., "The Microstructure of Slightly Substoichiometric NbO2," Journal of Solid State Chemistry, vol. 20, pp. 331-344 (1977).

Schafer, "Uber die Darstellung der Nioboxide und ihren Transport im Temperaturgefalle," Z. anorg. Allg. Chemie. vol. 317, pp. 321-333, (1962) w/ partial English translation.

Mifune, et al., "Niobium Solid Electrolytic Capacitors," National Technical Report 1, 147, pp. 1-14, (1963) (in English).

Lapitskii, et al., "The formation of the lower oxides of niobium and tantalum in some reactions of reduction and oxidation," Zhurnal Neorganicheskoi Khimii, vol. 11, No. 1, pp. 80-91, (1957).

Orlov et al., "Sutdy of Oxygen Solubility in Niobium," Metally, No. 5, pp. 202-205 (1985).

Brauer et al., "Mikrokristallines NbO," p. 1462 w/ partial English translation.

Notice of Opposition for EP 1115658 B1 with English Translation filed Apr. 2, 2004 by H.C. Stark GmbH.

Notice of Opposition for EP 1115658 B1 in English filed Apr. 8, 2004 by Strawman Limited.

* cited by examiner

PHASE FORMATION OF OXYGEN REDUCED VALVE METAL OXIDES AND GRANULATION METHODS

This application claims the benefit under 35 U.S.C. §119 (e) of prior U.S. Provisional Patent Application No. 60/450,536 filed Feb. 26, 2003, which is incorporated in its entirety by reference herein.

BACKGROUND OF THE INVENTION

The present invention relates to materials useful for a variety of applications including electrolytic capacitors. More particularly, the present invention relates to oxygen reduced valve metal oxides and methods of preparing the same.

Niobium based electrolytic capacitor materials are gaining significant interest for their potential in competing with tantalum and aluminum electrolytic capacitors in the low voltage, high capacitance segment due to their cost and performance advantages. However, anodization and Nb2O5/Nb interfacial characteristics of these materials pose significant challenges in manufacturing high reliability capacitors.

The device miniaturization trend in electronic and communication applications also raises significant challenges to the components industry. Solid electrolytic capacitors with high volumetric efficiency, high reliability, and a wide application temperature range are a part of the solution to this challenge. In order to meet the increasing demands of high performance capacitor substrate materials at a reasonable cost, development of alternative material have become increasingly appealing. Researchers recently have investigated niobium (Nb) as a potential candidate. To date, however, there has not been a large commercial interest for a number of reasons. Recent developments have demonstrated that a niobium based oxide, NbO, is capable of being a capacitor anode that has a high quality dielectric layer via electrochemical process and offers good physical and electrical properties. In addition, due to its partially oxidized nature, NbO based devices are much less prone to thermal run away, thereby significantly reducing the risk of burning on a circuit broad in the event of device electrical failure.

As with any technology, there is always room for discovering additional embodiments and providing variations in methods to make materials which have a variety of uses, including uses in the electrolytic capacitor area.

SUMMARY OF THE PRESENT INVENTION

A feature of the present invention is to provide valve metal suboxides which contain one or more suboxide phases and optionally a metal phase.

Another feature of the present invention is to provide methods to form valve metal suboxides or oxygen reduced valve metal oxides which permit a more uniform phase formation of the valve metal suboxide.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a valve metal suboxide having one or more suboxide phases.

In particular, the present invention relates to a valve metal oxide containing a primary suboxide phase and a secondary suboxide phase and optionally a valve metal phase.

In addition, the present invention relates to a valve metal suboxide containing a primary suboxide phase purity of at least 75% by weight.

The present invention further relates to a method to prepare oxygen reduced valve metal oxides. The method involves granulating or agglomerating a) a valve metal oxide material, b) a valve metal material, or c) both a) and b) separately or as a mixture and/or d) granulating the oxygen-reduced valve metal oxide once formed. The granulating can be a wet granulating or dry granulating. The method can then involve heat treating the granulated material, if the granulated material is the valve metal oxide and/or valve metal, to form the oxygen reduced valve metal oxide. If the granulated material is oxygen-reduced valve metal oxide, a post-heat treatment can be used. Steps prior to the granulation as well as steps after the heat treatment to form the oxygen reduced valve metal oxides can be used as mentioned in detail below.

The present invention further relates to oxygen reduced valve metal oxides in granule form, for instance having a size of from about 30 microns to about 1000 microns, and optionally good flow properties.

It is to be understood that both the foregoing general description and the following detailed description are exemplary and explanatory only and are intended to provide a further explanation of the present invention, as claimed.

DETAILED DESCRIPTION OF THE PRESENT INVENTION

Figure 1:
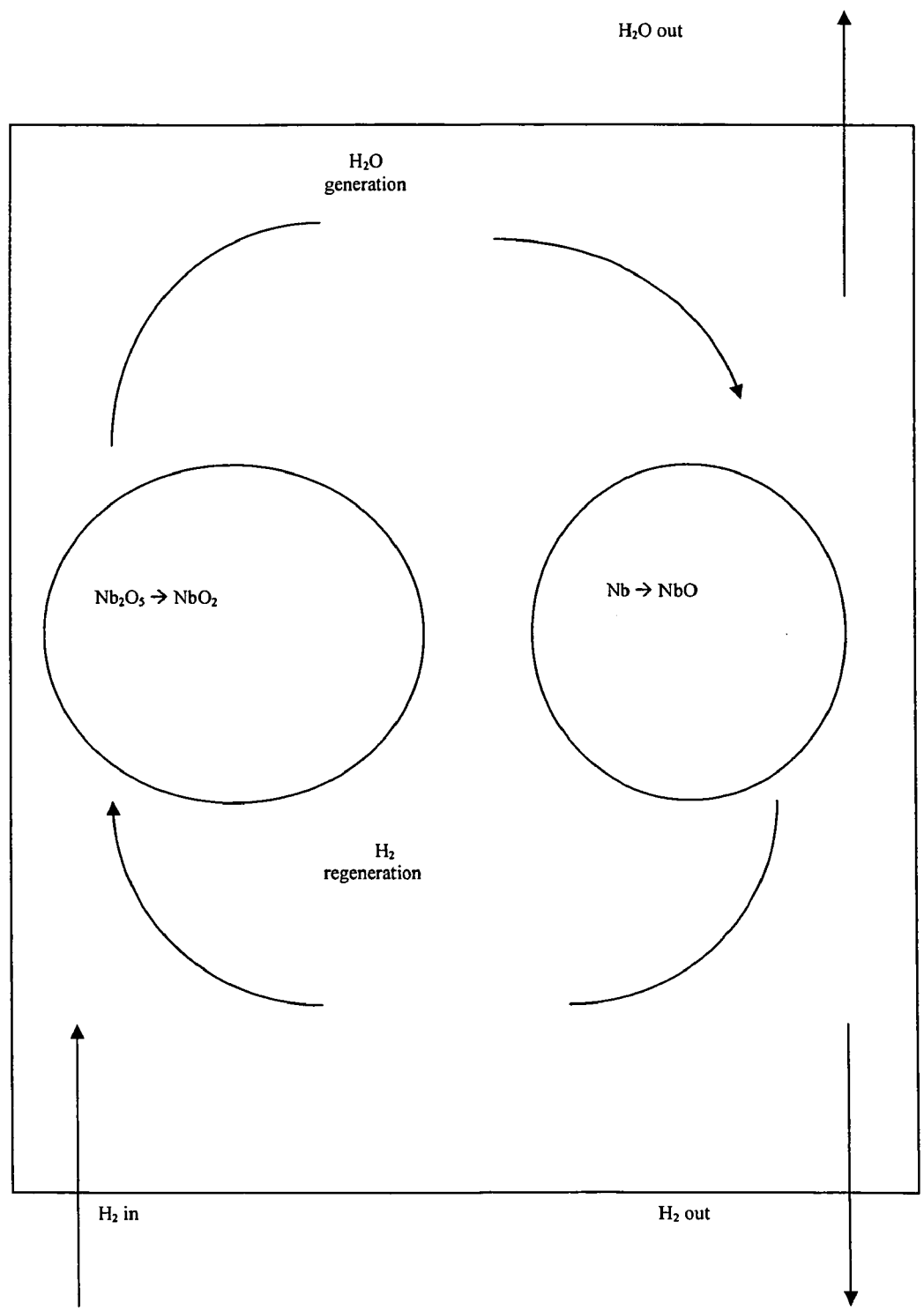
FIG. 1 is a schematic drawing setting forth the initial reaction to form valve metal suboxides.

The process of fabricating NbO based powders can be obtained either through the direct reduction of Nb2O5 and/or the oxidation of Nb metal. A technique of producing high surface area NbO powder involves reacting Nb metal powder with Nb2O5 powder and processing the mixture according to reaction (1).

$$3Nb + Nb_2O_5 \rightarrow 5NbO \qquad (1)$$

For instance, the reduction of Nb2O5 with H2 in the presence of an oxygen getter such as Nb metal has been evaluated using equilibrium and modeling calculations. The thermodynamic equilibrium calculations show that an excess amount of H2 can be used to reduce Nb2O5 to NbO2 and a larger excess of H2 can be used to reduce NbO2 to NbO as shown in reactions (2) and (3), respectively.

$$Nb_2O_5 + H_2 \rightarrow 2NbO_2 + H_2O \qquad (2)$$

$$NbO_2 + H_2 \rightarrow NbO + H_2O \qquad (3)$$

In one embodiment, the addition of Nb metal shifts the equilibrium toward NbO formation because the Nb consumes the by-product H2O, regenerating the H2 as shown in reactions (4) and (5).

$$NbO_2 + H_2 \rightarrow NbO + H_2O \qquad (4)$$

$$Nb + H_2O \rightarrow NbO + H_2 \qquad (5)$$

The overall reaction of Nb2O5 and Nb metal to form NbO is generally spontaneous and exothermic. The initial stage of the reaction is shown schematically in FIG. 1.

Figure 2:
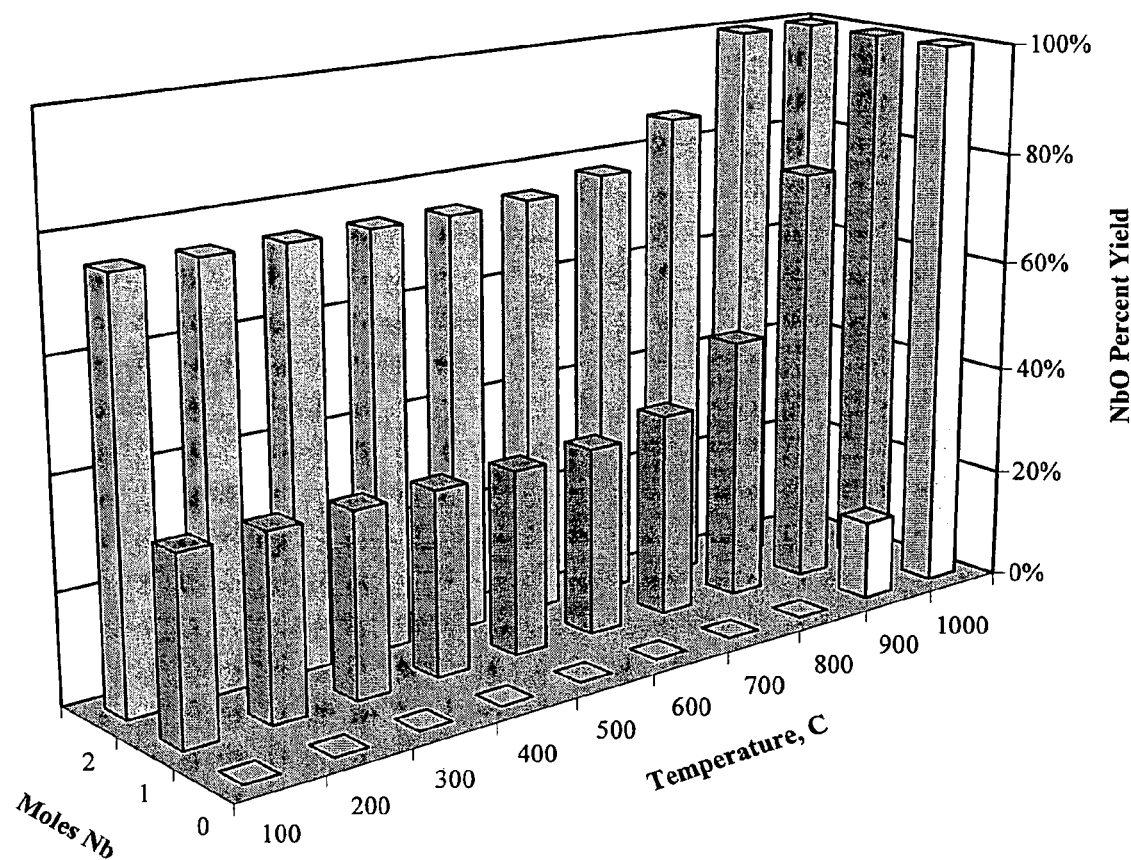
FIG. 2 is a bar graph which illustrates the percent conversion to NbO in the presence of H2 as a function of temperature and initial moles of Nb metal.

In one embodiment, as the H2O is consumed or carried away, the intermediate NbO2 is converted to NbO. If the reaction conditions (temperature, time, stoichiometric ratio of Nb/Nb2O5, or H2 partial pressure) are insufficient, intermediate phases such as NbO2 can be present. FIG. 2 illustrates the percent conversion to NbO in the presence of H2 as a function of temperature and initial moles of Nb metal. In all of the examples, in lieu of Nb or in combination, hydrided niobium (or hydrided valve metals, hydrided getter material) can be used, such as NbH. Either the hydrided metal is used, or they can be hydrided during the process. Any discussion or characteristics of the getter material for metals applies equally to hydrided getter material.

While the above discussion relates to NbO, it is for exemplary purposes. Other oxygen reduced valve metal oxides can be used. The oxygen reduced valve metal oxides, examples thereof, methods to prepare the same, and various applications are described in detail in U.S. Pat. Nos. 6,462,934, 6,416,730, 6,391,275, 6,373,685, 6,322,912, wherein each of these patents (and any patents and publications mentioned throughout this application) are incorporated in their entirety by reference herein and form a part of the present application. The various products as well as the methods and starting materials can be used as modified herein for purposes of the present application.

In one embodiment of the present invention, the present invention relates to a valve metal suboxide or an oxygen reduced valve metal oxide. In this embodiment, the valve metal suboxide contains a primary suboxide phase purity and can contain a secondary suboxide phase, a tertiary suboxide phase, a valve metal phase, and any combinations thereof. More than one, more than two, and more than three different suboxide phases can exist in the valve metal suboxide of this embodiment.

As an example, a valve metal suboxide can contain a primary suboxide phase purity of at least 75% by weight. The amount of this purity can be less or more depending upon the desired valve metal suboxide being formed. The valve metal suboxide can have a primary suboxide phase purity of at least 80% by weight, or at least 85% by weight, or at least 90% by weight, or at least 95% by weight. Other primary phase purities can include at least 98% by weight, at least 99% by weight, at least 99.5% by weight, at least 99.9% by weight, and at least 99.95% or higher by weight.

As indicated, the valve metal suboxide can contain other suboxide phases such as a secondary suboxide phase. The amount of the secondary suboxide phase can be any remaining amount in view of the amount of the primary suboxide phase and secondary suboxide phase. For instance, the secondary suboxide phase can be present in an amount of from about 0.01 or less to about 25% by weight or more. Other ranges include, for instance, from about 0.1 to about 10% by weight, from about 0.1 to about 5% by weight, and from about 0.1 to about 1% by weight. Other ranges and specific amounts can be present with respect to this secondary suboxide phase. Similarly, a tertiary suboxide phase which is different from the secondary suboxide phase and the primary suboxide phase can be present. Other suboxide phases in addition to the primary, secondary, and tertiary can be present. With respect to the tertiary suboxide phase, generally this phase can be present in amounts equal to or less than the secondary suboxide phase. The amounts described above with respect to the secondary suboxide phase would apply to the tertiary suboxide phase and any other phases that may be present.

The valve metal suboxide can also contain as an option a valve metal phase. This phase is not a valve metal suboxide but is an essentially pure valve metal phase. The valve metal phase can be present in any amount such as from about 0.01 or less to about 25% by weight or more. Other ranges include from about 0.1 to about 10% by weight, from about 0.1 to about 5% by weight, and from about 0.1 to about 1% by weight.

The various phases that comprise the valve metal suboxide as well as any valve metal phase are present in any form. These various phases, if present, can be detected in powders and are most evident in a sintered or pressed body of powder, such as a capacitor part, like an anode. The various phases can exist in the same agglomerate or aggregate or can be present in a sintered or pressed body of various materials. These various phases described above can be uniformly distributed throughout the valve metal suboxide or can be present in various specific locations. For instance, a primary suboxide phase may be primarily present in the outer regions of a pressed or sintered body, whereas a secondary oxide phase may be primarily present in the center of the body and an optional valve metal phase may be present in the core area of the body. Any combination of phase distributions with respect to location and uniformity can be achieved with the present invention depending upon desired properties. As another example of phase distribution, various agglomerates or sintered or pressed bodies can each have multiple phases. The phases can exist in the form of a "coating" for purposes of analogy only. Thus, one phase such as the valve metal phase or primary suboxide phase can act like the core where other phases surround the core in the form of "layers" as different phases, like "coatings" surrounding a core.

For purposes of this invention, the valve metal suboxide may also be considered a partially reduced valve metal oxide or an oxygen reduced valve metal oxide. The primary phase discussed above can be any suboxide phase as exemplified below. The secondary suboxide phase, if present, is a suboxide phase that is different from the primary phase. The tertiary suboxide phase(s) is also any suboxide exemplified below and is different from the secondary suboxide phase and the primary suboxide phase. The valve metal phase is any valve metal and is typically the same type of valve metal as in the valve metal suboxide. Again, examples are set forth below.

The oxygen reduced valve metal oxide is any metal oxide which has a lower oxygen content in the metal oxide compared to the starting valve metal oxide. Typical reduced valve metal oxides comprise NbO, $NbO_{0.7}$, $NbO_{1.1}$, $NbO_2$, TaO, AlO, $Ta_6O$, $Ta_2O$, $Ta_2O_{2.2}$, or any combination thereof with or without other oxides present. One may consider, for instance, NbO and $NbO_2$ to be the pure phases, while suboxides like $NbO_{0.7}$ and $NbO_{1.1}$ to be the result of a mixture of pure phases. Generally, the reduced metal oxide of the present invention has an atomic ratio of metal to oxygen of about 1:less than 2.5, and preferably 1:2 and more preferably 1:1.1, 1:1, or 1:0.7. Put another way, the reduced metal oxide preferably has the formula $M_xO_y$, wherein M is a valve metal, x is 2 or less, and y is less than 2.5x. More preferably x is 1 and y is less than 2, such as 1.1, 1.0, 0.7, and the like. The oxygen reduced metal oxides can also contain levels of nitrogen, e.g., from about 100 ppm to about 30,000 ppm $N_2$, or other dopants. The valve metal oxide can be in any form, such as powder (e.g., unagglomerated or agglomerated, granular, pellets) and the like. The valve metal oxide can have any of the properties described throughout the present application, such as flow, surface area, and the like.

In general, the process to make the oxygen reduced valve metal oxides includes the steps of heat treating the valve metal oxide in the presence of a getter material, which preferably is a tantalum and/or niobium getter material or other getter material depending on the metal oxide being reduced, in an atmosphere which permits the transfer of oxygen atoms from the metal oxide to the getter material, for a sufficient time and at a sufficient temperature to form an oxygen reduced valve metal oxide. As indicated, hydrided forms of the getter material can be used.

For purposes of the present invention, examples of starting valve metal oxides can be, but are not limited to, at least one oxide of the metals in Groups 4, 5, and 6 (IUPAC designations) of the Periodic Table, aluminum, bismuth, antimony, and alloys thereof and combinations thereof. Preferably, the valve metal oxide is an oxide of tantalum, aluminum, titanium, zirconium, niobium, and/or alloys thereof, and most preferably is a niobium oxide, a tantalum oxide, or alloys thereof. Generally, the alloys of the valve metal oxides will have the valve metal as the predominant metal present in the alloy oxide. Specific examples of starting valve metal oxides, include, but are not limited to $Nb_2O_5$, $Ta_2O_5$, and $Al_2O_3$. The oxygen reduced valve metal oxide(s) can be the oxygen reduced product of these starting oxides.

The metal oxide can also be a metal oxide which is a semi-conductor as a lower oxide and which converts to a higher oxide with high insulating properties and has useful dielectric properties.

The starting valve metal oxide as well as the getter material and the final product in the present invention can be in any shape or size. The valve metal oxide, getter material, and/or final product can be in the form of a powder or a plurality of particles. Examples of the type of powder that can be used include, but are not limited to, flaked, angular, nodular, and mixtures or variations thereof. Preferably, the valve metal oxide is in the form of a powder which more effectively leads to the oxygen reduced valve metal oxides. Examples of such preferred metal oxide powders include those having mesh sizes of from about 60/100 to about 100/325 and from about 60/100 to about 200/325 mesh. Another range of size is from about −40 mesh to about −325 mesh. The getter material for purposes of the present invention is any material capable of reducing the specific starting valve metal oxide. Preferably, for starting metal oxides like tantalum or niobium, and the like, the getter material is tantalum or niobium respectively. More preferably, the getter material is the same type of base metal as the starting metal oxide. The tantalum or niobium getter material is any material containing tantalum metal or niobium metal which can remove or reduce at least partially the oxygen in the valve metal oxide. Thus, the tantalum or niobium getter material can be an alloy or a material containing mixtures of tantalum metal with other ingredients. Preferably, the tantalum or niobium getter material is predominantly, if not exclusively, tantalum metal or niobium metal respectively. The purity of the metal is not important but it is preferred that high purity metal comprise the getter material to avoid the introduction of other impurities during the heat treating process. Accordingly, the metal in the metal getter material preferably has a purity of at least about 98% and more preferably at least about 99%. Further, it is preferred that impurities (other than oxygen and hydrogen) are not present or are present in amounts below about 100 ppm. Also, the metal as the getter material can have a high surface area and/or high porosity. Preferably, the tantalum, niobium, or other getter material is a capacitor grade material such as tantalum or niobium having a capacitance capability of about 30,000 Cv/g or more and more preferably about 50,000 Cv/g or more and most preferably about 75,000 Cv/g to about 100,000 Cv/g or more. The getter material can be removed after being used or can remain as part of the final product. Preferably, if the getter material is to remain with the oxygen-reduced metal oxides, then it is preferred that the getter material be the same base metal as the starting metal oxide and can have a similar shape and size to the starting metal oxide. Further, preferably high purity, high surface area, and high porosity getter material is used since such material can obtain the same or similar oxide state as the oxygen-reduced metal oxide. Thus, the method can achieve a 100% yield of oxygen reduced metal oxide. The getter material can therefore act as the getter material and also remain to become part of the oxygen-reduced valve metal oxide.

The getter material can be in any shape or size. For instance, the getter material can be in the form of a tray which contains the metal oxide to be reduced or can be in a particle or powder size. Preferably, the getter materials are in the form of a powder or granule in order to have the most efficient surface area for reducing the metal oxide. The getter material, thus, can be flaked, angular, nodular, and mixtures or variations thereof.

Similarly, other getter materials can be used alone or in combination with the tantalum or niobium getter materials for instance, magnesium, sodium, potassium, aluminum, zirconium, titanium, and the like. Again, these types of getter materials can contain other getter materials and/or other ingredients. For purposes of the present invention, the getter material is stable during the heat treatment step and is not volatizable at the heat treatment temperatures used for the specific starting valve metal oxide being reduced. Also, other materials can form a part of the getter material.

Generally, a sufficient amount of getter material (e.g., oxygen getter material) is present to at least partially reduce the valve metal oxide being heat treated. Further, the amount of the getter material is dependent upon the amount of reducing desired to the metal oxide. If the metal oxide is to be reduced substantially with respect to its oxygen presence, then the getter material is present in a weight ratio of 0.5:1 to 1.5:1 by weight (getter material:metal oxide).

The heat treating that the starting metal oxide is subjected to can be conducted in any heat treatment device or furnace commonly used in the heat treatment of metals, such as niobium and tantalum. The heat treatment of the metal oxide in the presence of the getter material is at a sufficient temperature and for a sufficient time to form an oxygen reduced valve metal oxide. The temperature and time of the heat treatment can be dependent on a variety of factors such as the amount of reduction of the valve metal oxide, the amount of the getter material, and the type of getter material as well as the type of starting metal oxide. The heat treatment can be at any temperature which permits the reducing of the starting valve metal oxide and which is below the melting point of the valve metal oxide being reduced. Generally, the heat treatment of the starting metal oxide will be at a temperature of from about 800° C. or less to about 1900° C., and other temperatures can be from about 800° C. to about 950° C., such as about 850° C., for a time of from about 5 minutes to about 100 minutes, and more preferably from about 30 minutes to about 60 minutes. Routine testing in view of the present application will permit one skilled in the art to readily control the times and temperatures of the heat treatment in order to obtain the proper or desired reduction of the metal oxide.

The heat treatment occurs in an atmosphere which permits the transfer of oxygen atoms from the metal oxide to the getter material. The heat treatment preferably occurs in a hydrogen containing atmosphere which is preferably just hydrogen. Other gases can also be present with the hydrogen, such as inert gases, so long as the other gases do not react with hydrogen. Preferably, the hydrogen atmosphere is present during the heat treatment at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the valve metal oxide.

During the heat treatment process, a constant heat treatment temperature can be used during the entire heat treating process or variations in temperature or temperature steps can be used. For instance, hydrogen can be initially admitted at 1000° C. followed by increasing the temperature to 1250° C. for 30 minutes followed by reducing the temperature to 1000° C. and held there until removal of the $H_2$ gas. After the $H_2$ or other atmosphere is removed, the furnace temperature can be dropped. Variations of these steps can be used to suit any preferences of the industry.

The starting valve metal oxides can be prepared by calcining, for instance, at 1000° C. until removal of any volatile components. The oxides can be sized by screening. Preheat treatment of the oxides can be used to create controlled porosity in the oxide particles.

The reduced metal oxides of the present invention can have a microporous surface and can have a sponge-like structure, wherein the primary particles can be about 1 micron or less. The reduced metal oxides of the present invention can have a high specific surface area, and a porous structure with approximately 50% porosity. Further, the reduced metal oxides of the present invention can be characterized as having a preferred specific surface area (BET) of from about 0.5 to about 10.0 $m^2/g$ or more, such as from about 0.5 to about 2.0 $m^2/g$, or from about 1.0 to about 1.5 $m^2/g$. The preferred apparent density of the powder of the metal oxides is less than about 2.0 g/cc, more preferably, less than 1.5 g/cc and more preferably, from about 0.5 to about 1.5 g/cc.

The various embodiments concerning the multiple phases for the valve metal suboxide can be achieved, for instance, by controlling the degree of mixing between the starting materials. As shown in the patents described above, generally a valve metal (or other getter material) and a starting valve metal oxide are heat treated in proper proportions in order to achieve a desired valve metal suboxide or oxygen reduced valve metal oxide. Throughout this application, a valve metal is at times referred to as the getter material. It is to be appreciated that in lieu of a valve metal, any suitable getter material can be used as described in the above-identified patents. Preferably, the getter material is a valve metal and is a valve metal that matches the same valve metal that is present in starting the valve metal oxide that will be reduced. Also, it is preferred that the getter material and the starting valve metal oxide comprise the final product. In other words, the getter material also becomes the oxygen reduced valve metal oxides as well as the starting valve metal oxide. Preferably, these starting ingredients are mixed together prior to subjecting the material to heat treatment. If one wanted a very high single phase purity such as on the order of 95% or higher, then to achieve this, in one embodiment, the starting materials are mixed together to form a very uniform and intimate mixture of the ingredients which promotes a high phase purity. If on the other hand, one wanted multiple phases, then the degree of mixing would be decreased such that the starting materials are not intimately mixed together. Thus, the degree of mixing such as the time of mixing and the techniques used to mixing can control the phase purity of the valve metal suboxides of the present invention. To achieve a high degree of mixing, a wet or dry milling can be used to form an intimate mixture. Whereas if a less than intimate mixture is desired, the degree of mixing can be greatly reduced by using less than optimal mixing conditions and even mixing the ingredients by hand or similar less effective techniques. Another way to control phase purity is by controlling the time of heat treatment. Less heat treatment times can lead to multiple phases.

In another embodiment of the present invention, prior to subjecting the starting materials to heat treatment in order to form the desired oxygen reduced valve metal oxide, one or both of the starting materials, namely the starting valve metal oxide and/or the valve metal (e.g., the getter material), can be granulated or agglomerated. The granulation can occur by a number of techniques. For instance, wet screening or drum agglomeration of wet material can be used. Other examples of agglomeration techniques include a tilted dish agglomeration which involves a rotating pan set on an angle to which fresh powder is added and on which a fine water spray, optionally with binders, is used. The agglomerate builds up as a spherical mass and eventually rolls off the pan into a collector. Another example is dry drum agglomeration which involves taking a powder and adding it to a large drum which turns fairly rapidly and has lifters. The showering particles are brought in contact with pellets and lightly hammered together. Another example is compactors which are devices that press the powder plus recycle between two rolls and makes slabs which are then milled to give feed to a screen set. Another example is a pin pelletizer.

As indicated above, the granulation can occur in a dried state or wet state. The liquid used can be water, water-based liquids, alcohols, organic liquids, and the like. With respect to screening, the granulation can occur by passing the powder over a screen, such as 20 mesh with openings larger than the desired granule size (for instance, less than 40 mesh). The majority of granules have sizes smaller than the openings and a few fines (for instance, less than 50 microns). This method works especially well for powders with high surface area (for example, greater than 1.5 $m^2/g$). Another method imparts the tumbling motion of moist particles to form spherical shaped granules. The water content in the powder, primary particle size, the rotation speed, and the size of media and tumbling time can be used to control the final granule size. Typical water contents are less than 50% by weight of the total ingredients and more preferably less than 30% by weight and residence times are preferably less than an hour to form granules greater than 50 microns in size (average). Screening operations to classify the materials may also be used to remove excessively large or small granules from the final product. The large and fine granules may be recycled and again used as feed material. As indicated above, the water content can be any amount such as amounts from about 5% to about 40% by weight of the total materials used in agglomeration and more preferably from about 10% to about 30% by weight. Tumbling speed during granulation when a tumbling motion is used can be any rotational speed depending upon the size of the tumbler. For a small lab tumbler, for instance, rotational speeds can be from about 30 to about 60 rpms and more preferably from about 40 to about 50 rpms. The amount of material granulated can be any amount and of course depends upon the size of the device being used to form granulation. Preferably, a media (e.g., 1/16"-1/2") can be also used during granulation such as media balls made from the same metal that forms the metal oxide. The media can be present in any amount, such as from about 1% to about 20% or from about 5 to 10% by volume. If wet granulating is used, the liquid can be added at any rate, such as a slow continuous rate or as a spray until the desired granule size is achieved. After granulation, if a liquid is used, the powder can then be dried using any drying technique such as drying under a vacuum oven or a convection oven at relatively lower temperatures. For instance, the drying can occur at temperatures of from about 85° C. to about 100° C. for about 15 minutes to about 60 minutes or more. The granules can then be classified by screening the granules. The screening operation can be preformed either before or after the drying step. While any size can be achieved by this screening, examples include −40 mesh (−425 microns) or −50 mesh (−300 microns). The screening allows the removal of coarse and fine granules based on desired particle distribution.

The granulation methods of the present invention preferably form granules that have excellent flow properties such as from about 100 to about 1000 mg/s and more preferably from about 300 to about 700 mg/s as measured by ASTM B 213 using a 3 mm diameter orifice. In one embodiment of the present invention, the present invention relates to a oxygen reduced valve metal oxide that comprises granules preferably having a size of from about 5 to about 1000 microns and more preferably from about 30 to about 300 microns. In one embodiment, 10% of the granules ($D_{10}$) are less than 30 microns. Furthermore, in another embodiment, the granules also have a flow of from about 100 to about 1,000 mg/s and more preferably from about 300 to about 700 mg/s. Preferably, the oxygen reduced valve metal oxide is niobium oxide and more preferably a niobium oxide having an atomic ratio of niobium to oxygen of from 1:less than 2.5 and more preferably an atomic ratio of from 1:less than 1.5 and more preferably an atomic ratio of from 1:less than 1.1 such as NbO, $NbO_{1.1}$, $NbO_{0.7}$, or combinations thereof. The granulated products of the present invention preferably provide excellent physical properties with respect to bulk density, flowability, green strength, and pressability of the powders. With the granulation techniques of the present invention, one can maintain the desired microstructure and electrical properties of the fine powders while retaining the physical properties during the forming process.

Once any of the starting components are optionally granulated, then if a mixture of the starting valve metal and the starting valve metal oxide were not granulated together, the starting components can be brought together. As stated above, granulation can occur with respect to each individual starting material or one of the materials can be granulated and then mixed with the other starting material or both materials can be granulated separately and then mixed together. Essentially any combination of ungranulated and granulated starting materials can be used for purposes of the present invention.

Once the desired granulation has occurred, then, if the starting materials have not already been mixed together, the materials should be mixed together as stated above using the various milling or mixing techniques, such as ball milling, v-blender, vibratory milling, attritor milling, and the like. Alternatively, the granulation method described above can be used with the final product. In other words, once the oxygen reduced valve metal oxide is formed, this material can then be subjected to a granulation in order to form the desired granules as described above. Furthermore, as an option, multiple granulations can be used, for instance, wherein the final product is granulated and as the starting materials are separately or in a combined state granulated.

In forming the oxygen reduced valve metal oxide, the reaction conditions set forth in the above-identified patents can be used. As a summary, the valve metal suboxide or oxygen reduced valve metal oxide is formed by heat treating a starting valve metal oxide in the presence of a getter material and preferably in an atmosphere which permits the transfer of oxygen atoms from the starting valve metal oxide to the getter material, for a sufficient time and temperature to form an oxygen reduced valve metal oxide. In a preferred embodiment, the getter material is the same type of valve metal that is present in the valve metal oxide. In other words, when the starting valve metal oxide is niobium pentoxide, preferably, the getter material is niobium. Furthermore, the atmosphere which is preferably present to permit the transfer of oxygen atoms from the starting valve metal oxide to the getter material is a hydrogen atmosphere though other atmospheres can be used such as inert atmospheres and the like. The hydrogen atmosphere, and preferably high pressures of hydrogen atmosphere, lead to single primary phase valve metal oxides with little or no secondary or tertiary suboxide phases.

After formation of the oxygen reduced valve metal oxide, optionally, the oxygen reduced valve metal oxide can then by subjected to one or more post-heat treatments. These post-heat treatments serve to join the granules together in a network and further promotes a porous matrix that exists with the sintered and joined granules. The post-heat treatment can occur at any temperature such as temperatures sufficient to join the granules together but not melt the granules. Examples of suitable temperatures include but are not limited to from about 600° C. to about 1400° C. Other suitable post-heat treatment temperature are from about 800° C. to about 1200° C. Suitable post-heat treatment times include from about 10 minutes to about 5 hours such as from about 1 hour to about 2 hours. The post-heat treatment preferably occurs under vacuum or inert gas such as vacuums of $10^{-5}$ Torr.

The present invention can extend the amount of tantalum or other valve metal in products, such as a capacitor since an anode containing oxygen-reduced tantalum oxide (or other capacitor grade metal oxide) contains less tantalum than the same anode having just tantalum metal. Yet, the properties obtainable are similar, such as capacitance and DC leakage capabilities. This advantage can lead to cost savings and other advantages to capacitor manufacturers.

The various oxygen reduced valve metal oxides of the present invention can be further characterized by the electrical properties resulting from the formation of a capacitor anode using the oxygen reduced metal oxides of the present invention. In general, the oxygen reduced metal oxides of the present invention can be tested for electrical properties by pressing powders of the oxygen reduced metal oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced valve metal oxides of the present invention. Anodes can be made from the powdered form of the reduced oxides in a similar process as used for fabricating metal anodes, i.e., pressing porous pellets with embedded valve metal lead wires followed by sintering and anodizing. Anodes made from some of the oxygen reduced metal oxides of the present invention can have a capacitance of from about 20,000 or lower CV/g to about 300,000 CV/g or more, and other ranges of capacitance can be from about 62,000 CV/g to about 200,000 CV/g and preferably from about 60,000 to 150,000 CV/g. In forming the capacitor anodes of the present invention, a sintering temperature can be used which will permit the formation of a capacitor anode having the desired properties. The sintering temperature will be based on the oxygen reduced metal oxide used. Preferably, the sintering temperature is from about 1200° C. to about 1750° C. and more preferably from about 1200° C. to about 1500° C. and most preferably from about 1300° C. to about 1500° C. when the oxygen reduced valve metal oxide is an oxygen reduced niobium oxide. The sintering temperatures when the oxygen reduced valve metal oxide is an oxygen reduced tantalum oxide can be the same as for niobium oxides.

The anodes formed from the valve metal oxides of the present invention are preferably formed at a voltage of from about 1 volt to about 100 volts, and preferably from about 6 to about 70 volts. Furthermore, when an oxygen reduced niobium oxide is used, preferably, the forming voltages are from about 6 to about 50 volts, and more preferably from about 10 to about 40 volts. Other higher or lower formation voltages can be used. Anodes of the reduced metal oxides can be prepared by fabricating a pellet with a lead wire or other connector followed by treatment in $H_2$ atmosphere or other suitable atmosphere in the proximity of a getter material, just as with powdered metal oxides of the present invention, followed by optional sintering and anodizing. In this embodiment, the anode article produced can be produced directly, e.g., forming the oxygen reduced metal oxide and an anode at the same time. The lead connector can be embedded or attached at any time before anodizing. Forming voltages using other metal oxides are expected to be similar or about the same and can even be higher for valve metal oxides like tantalum oxides. Also, the anodes formed from the oxygen reduced metal oxides of the present invention preferably have a DC leakage of less than about 5.0 nA/CV. For instance, in an embodiment of the present invention, the anodes formed from some of the oxygen reduced niobium oxides of the present invention have a DC leakage of from about 5.0 nA/CV to about 0.10 nA/CV or less.

The present invention also relates to a capacitor anode or other part in accordance with the present invention having a metal oxide film on the surface of the capacitor-anode or other part. Preferably, when the oxygen reduced valve metal oxide is an oxygen reduced niobium oxide, the film is a niobium pentoxide film. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors and anodes thereof of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

The present invention will be further clarified by the following examples, which are intended to be exemplary of the present invention.

EXAMPLES

Example 1

Mixture of Nb and Nb2O5

Initial Mixing Step
100 g Nb granular material
80 g Nb2O5
30% by volume 3/16" Nb media
Mix time=1 hour
RPM=80
Remove media
Granulation Step
175 g powder (Nb+Nb2O5)
5% by volume 3/16" Nb media
27.5 g water (~12%)
RPM=50
Tumble with water addition less than 1 hour
Dry
Screen
Collect granulated powder Example 2

Mixture of Nb and Nb2O5

Initial Mixing Step
25 g Nb granular material
18.75 g Nb2O5
30% by volume 3/16" Nb media
Mix time=1 hour
RPM=85
Remove media
Granulation Step
45 g powder (Nb+Nb2O5)
5% by volume 3/16"Nb media
12 g water (~21%)
RPM=50
Tumble with water addition less than 1 hour
Dry
Screen
Collect granulated powder Example 3

Nb2O5 Powder

Granulation Step Only
200 g Nb2O5
5% by volume 3/16" Nb media
90 g water (~30%)
RPM=50
Tumble with water addition less than 1 hour
Dry
Screen
Collect granulated powder Various mixing methods were applied to several niobium starting metals and a constant $Nb_2O_5$ feedstock to study the degree of mixing on flow, porosity, electrical performance, and reactivity in a hydrogen atmosphere. Table 1 below sets for the results of these variables. As illustrated in Table 1, two mixing levels, high and low were implemented for a given reaction condition within the Nb Phase Stability Field. As shown in the table, a high degree of mixing led to a high electrical phase purity.

TABLE 1

| Degree of Mixing | Nb Feed Type | Phase Purity Nb wt % | $NbO_2$ wt % | NbO wt % | Wet Electrical Data* CV/g 2.5 V | CV/g 10 V | DCL nA/CV |
|---|---|---|---|---|---|---|---|
| Low | E | 10.97 | 0.34 | 88.7 | 73718 | 57911 | 0.18 |
| High | E | 3.16 | 0.00 | 96.8 | 81114 | 63327 | 0.15 |
| Low | D | 6.32 | 0.14 | 93.5 | 77977 | 60900 | 0.21 |
| High | D | 2.82 | 0.00 | 97.2 | 84163 | 64993 | 0.18 |
| Low | B | 5.75 | 1.97 | 92.3 | 82849 | 65520 | 0.17 |
| High | B | 0.00 | 1.27 | 98.7 | 86513 | 70032 | 0.12 |
| Low | C | 11.11 | 3.12 | 85.8 | 76281 | 61337 | 0.14 |
| High | C | 0.00 | 0.76 | 99.2 | 90492 | 72512 | 0.15 |
| High | C | 0.00 | 0.40 | 99.6 | 99045 | 79379 | 0.14 |

The testing conditions are the same as U.S. Pat. No. 6,391,275, except that the $V_f$ was 30 volts. In the Table, D and E are coarse granular Nb with a BET of 1.5 m²/g. B and C are fine granular Nb with a BET of 2.6 m²/g. The $Nb_2O_5$ used was an optical grade from CBMM with a BET of 1.5 m²/g (a BET of 2.0 m²/g was used in the last example.) The materials were heated at 850° C. for 60 minutes in $H_2$ (about 900 Torr).

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A valve metal oxide having an atomic ratio of valve metal to oxygen of 1:less than 2.5, wherein said valve metal oxide comprises granules having a size of from about 5 microns to about 1,000 microns, wherein said valve metal oxide has a flow of from 300 to about 1,000 mg/s as measured by ASTM B 213-03 using a 3 mm diameter orifice, wherein said valve metal oxide is niobium oxide.

2. The valve metal oxide of claim 1, wherein said flow is from about 300 to about 700 mg/s.

3. The valve metal oxide of claim 1, wherein said granule size from about 30 to about 300 microns.

4. The valve metal oxide of claim 1, wherein said valve metal is niobium having an atomic ratio of niobium to oxygen of is 1:less than 1.5.

5. The valve metal oxide of claim 1, wherein said atomic ratio is 1:1.1.

6. The valve metal oxide of claim 1, wherein the atomic ratio is 1:0.7.

7. The valve metal oxide of claim 1, wherein said atomic ratio is 1:0.5.

8. The valve metal oxide of claim 1, wherein said valve metal has a specific surface area of from about 0.5 to about 10.0 m²/g.

9. The valve metal oxide of claim 1, wherein said niobium oxide comprises NbO.

10. The valve metal oxide of claim 1, wherein said niobium oxide comprises NbO0.7, NbO1.1, or combinations thereof.

11. The valve metal oxide of claim 1, further comprising nitrogen.

12. The valve metal oxide of claim 1, wherein said valve metal oxide has the shape that is nodular, flaked, angular, or combinations thereof.

13. A capacitor comprising the valve metal suboxide of claim 1.

14. A capacitor anode comprising the valve metal suboxide of claim 1.

15. The valve metal oxide of claim 1, wherein said valve metal oxide comprises a primary suboxide phase purity of at least 75% by weight.

16. The valve metal oxide of claim 1, wherein said valve metal oxide comprises a primary suboxide phase purity is at least 90% by weight.

17. The valve metal oxide of claim 1, wherein said valve metal oxide comprises a primary suboxide phase purity is at least 99.95% by weight.

18. The valve metal oxide of claim 1, wherein said valve metal oxide comprises a valve metal phase.

19. The valve metal oxide of claim 1, wherein said valve metal oxide comprises a secondary suboxide phase.

* * * * *

UNITED STATES PATENT AND TRADEMARK OFFICE
CERTIFICATE OF CORRECTION

PATENT NO.      : 7,655,214 B2                                    Page 1 of 1
APPLICATION NO. : 10/786621
DATED           : February 2, 2010
INVENTOR(S)     : Reed et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-third Day of November, 2010

David J. Kappos
*Director of the United States Patent and Trademark Office*